(12) United States Patent
Toosky et al.

(10) Patent No.: US 10,220,435 B2
(45) Date of Patent: Mar. 5, 2019

(54) INSTALLATION TOOLING SYSTEM FOR BUCKLE AND SWAGE TYPE FASTENER

(71) Applicant: POLARIS FASTENER TESTING AND TOOLING, LLC, Mission Viejo, CA (US)

(72) Inventors: Rahmatollah F. Toosky, San Clemente, CA (US); Nicholas A. Elliott, Mission Viejo, CA (US)

(73) Assignee: POLARIS FASTENER TESTING AND TOOLING, LLC, Mission Viejo, CA (US)

( * ) Notice: Subject to any disclaimer, the term of this patent is extended or adjusted under 35 U.S.C. 154(b) by 438 days.

(21) Appl. No.: 15/248,289

(22) Filed: Aug. 26, 2016

(65) Prior Publication Data

US 2017/0056959 A1   Mar. 2, 2017

Related U.S. Application Data

(60) Provisional application No. 62/210,217, filed on Aug. 26, 2015.

(51) Int. Cl.
*B21J 15/40*  (2006.01)
*B21J 15/02*  (2006.01)
(Continued)

(52) U.S. Cl.
CPC ............. *B21J 15/022* (2013.01); *B21J 15/36* (2013.01); *F16B 19/05* (2013.01)

(58) Field of Classification Search
CPC ........... B21J 15/022; B21J 15/36; F16B 19/05
(Continued)

(56) References Cited

U.S. PATENT DOCUMENTS 1,116,710 A   11/1914 Keller
1,365,719 A   1/1921  Ogden
(Continued)

FOREIGN PATENT DOCUMENTS

JP   08061348 A    3/1996
JP   2006038201 A  2/2006

OTHER PUBLICATIONS

PCT/US2010/048183. International Search Report & Written Opinion (dated May 13, 2011).
(Continued)

*Primary Examiner* — David B Jones
(74) *Attorney, Agent, or Firm* — Loza & Loza, LLP; Heidi L. Eisenhut

(57) ABSTRACT

A tooling installation system having unique tools which provide an external force directly to the sleeve end of a faster to create a bulb on the sleeve of the fastener is provided. The system provides external forces directly to the sleeve end of the fastener deforming a portion of the sleeve radially outward and onto the structure prior to swaging a second portion of the sleeve radially inward onto the pin. Additionally, the system controls formation of the sleeve by capturing an external portion of the sleeve creating a cavity between the tool and the structure for achieving proper bulb formation during installation prior to swage. The system also provides specific forces to the head of the pin and the head of the sleeve to insure proper seating of the fastener head against the structure inducing residual compressive stresses within the structure, thus improving mechanical properties such as fatigue life of the structure.

20 Claims, 6 Drawing Sheets

(51) Int. Cl.
  *B21J 15/36* (2006.01)
  *F16B 19/05* (2006.01)

(58) Field of Classification Search
  USPC .................................................. 29/243.529
  See application file for complete search history.

(56) References Cited

U.S. PATENT DOCUMENTS

| | | | |
|---|---|---|---|
| 2,343,143 A | 2/1944 | Gill | |
| 2,353,559 A * | 7/1944 | Hajek, Jr. | B21J 15/36 |
| | | | 72/466.5 |
| 2,531,048 A | 11/1950 | Huck | |
| 2,670,021 A | 2/1954 | Torrensen et al. | |
| 2,763,314 A | 9/1956 | Gill | |
| 3,180,203 A | 4/1965 | Vaughn | |
| 3,345,900 A | 10/1967 | Villo | |
| 3,463,046 A | 8/1969 | Welch et al. | |
| 3,505,921 A | 4/1970 | Wigam | |
| 3,698,278 A | 10/1972 | Trembley | |
| 3,750,525 A | 8/1973 | Waters et al. | |
| 3,785,241 A | 1/1974 | Fischer | |
| 3,789,728 A | 2/1974 | Shackelford | |
| 3,792,933 A | 2/1974 | Stencel | |
| 3,835,615 A | 9/1974 | King, Jr. | |
| 3,916,970 A | 11/1975 | Owens | |
| 3,933,025 A * | 1/1976 | Briles | B21J 15/10 |
| | | | 72/412 |
| 3,965,792 A | 6/1976 | King, Jr. | |
| 4,048,898 A | 9/1977 | Salter | |
| 4,102,036 A | 7/1978 | Salter | |
| 4,244,661 A | 1/1981 | Dervy | |
| 4,355,934 A | 10/1982 | Denham et al. | |
| 4,405,256 A | 9/1983 | King, Jr. | |
| 4,408,937 A | 10/1983 | Hainke et al. | |
| 4,649,733 A * | 3/1987 | Gilmore | B21J 15/36 |
| | | | 29/243.53 |
| 4,732,518 A | 3/1988 | Toosky | |
| 4,850,771 A | 7/1989 | Hurd | |
| 5,051,048 A | 9/1991 | Maddox | |
| 5,259,714 A | 11/1993 | Campbell | |
| 5,269,381 A * | 12/1993 | Oscarsson | B25D 17/24 |
| | | | 173/162.2 |
| 5,312,215 A | 5/1994 | Anquetin | |
| 5,588,323 A * | 12/1996 | Peterson | B21J 15/30 |
| | | | 29/243.53 |
| 6,042,315 A | 3/2000 | Miller et al. | |
| 6,176,662 B1 | 1/2001 | Champney et al. | |
| 6,279,371 B1 * | 8/2001 | Brewer | B21J 15/02 |
| | | | 72/437 |
| 6,773,215 B2 | 8/2004 | Cuva et al. | |
| 7,038,842 B2 | 5/2006 | Griseri et al. | |
| 7,059,815 B2 | 6/2006 | Ando et al. | |
| 7,059,816 B2 | 6/2006 | Toosky | |
| 7,114,900 B2 | 10/2006 | Toosky | |
| 7,237,314 B2 | 7/2007 | Toosky | |
| 7,566,195 B2 | 7/2009 | Hull | |
| 7,575,404 B2 | 8/2009 | Toosky et al. | |
| 7,695,226 B2 | 4/2010 | March et al. | |
| 7,698,798 B2 | 4/2010 | Toosky | |
| 7,802,952 B2 | 9/2010 | Toosky et al. | |
| 7,823,262 B2 | 11/2010 | Toosky et al. | |
| 2004/0231467 A1 | 11/2004 | Hufnagl et al. | |
| 2005/0002760 A1 | 1/2005 | Hayashi et al. | |
| 2005/0201844 A1 | 9/2005 | Davies et al. | |
| 2006/0193711 A1 | 8/2006 | Di-Mola | |
| 2007/0009338 A1 | 1/2007 | Hull | |
| 2008/0075555 A1 | 3/2008 | March et al. | |
| 2010/0278608 A1 | 11/2010 | Toosky | |

OTHER PUBLICATIONS

PCT/US2010/048183. International Preliminary Report on Patentability (dated Mar. 13, 2012).
PCT/US2011/024706. International Search Report & Written Opinion (dated Oct. 24, 2011).
PCT/US2011/024706. International Preliminary Report on Patentability (dated Aug. 21, 2012).

* cited by examiner

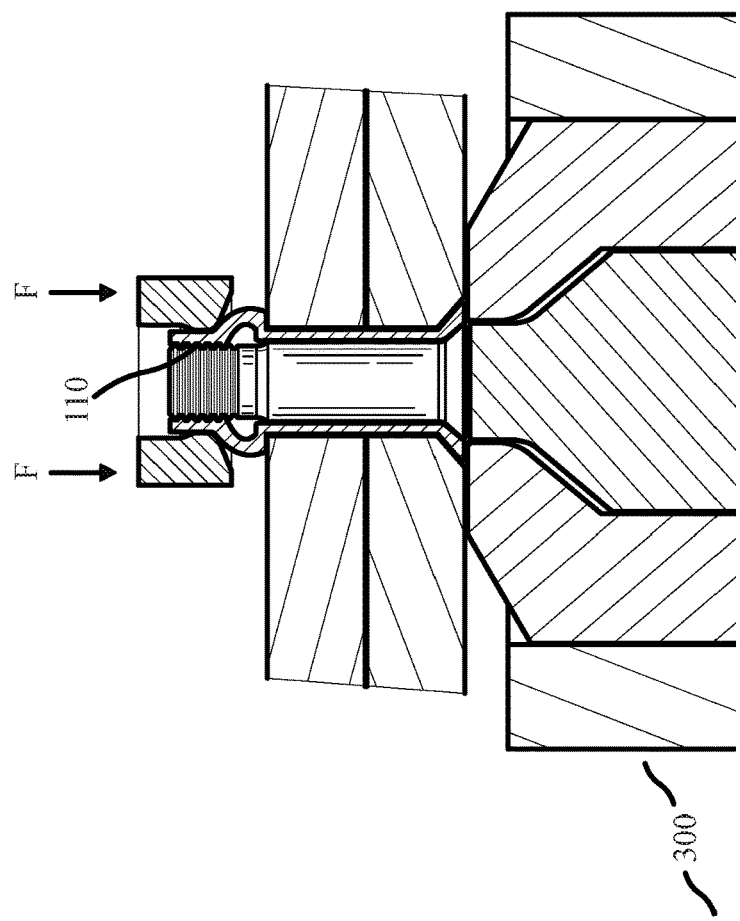
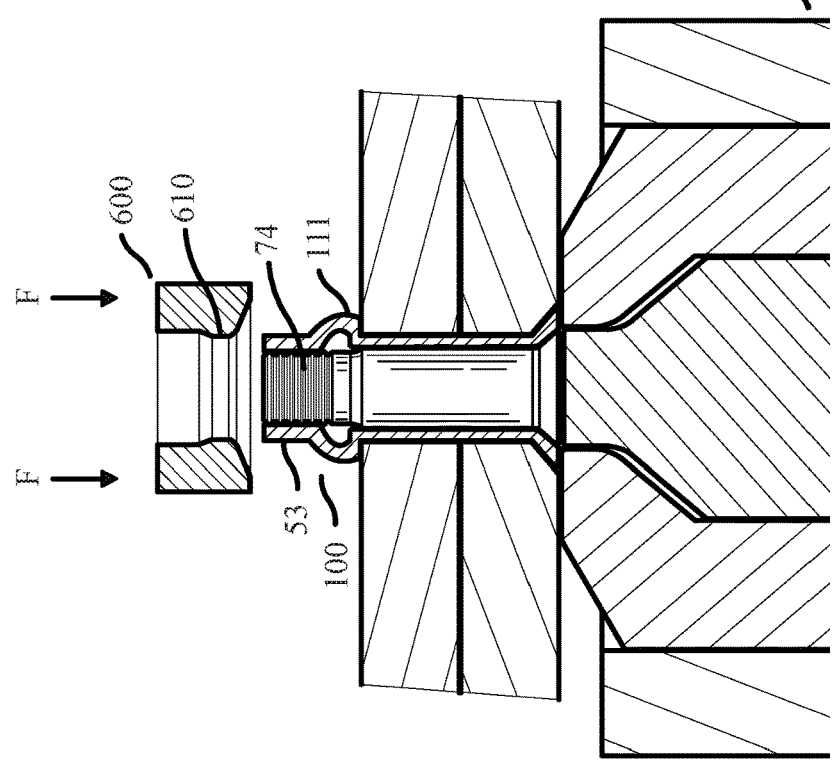
FIG. 7A
FIG. 7B

INSTALLATION TOOLING SYSTEM FOR BUCKLE AND SWAGE TYPE FASTENER

CLAIM OF PRIORITY UNDER 35 U.S.C. §119

The present Application for Patent claims priority to U.S. Provisional Application No. 62/210,217 entitled "INSTALLATION TOOLING SYSTEM FOR BUCKLE-SWAGE TYPE FASTENER", filed Aug. 26, 2015 and is hereby expressly incorporated by reference herein.

FIELD

Various embodiments pertain to tools used for the installation of Buckle and Swage type fasteners.

BACKGROUND

All fasteners require a means of installation. Tools used for installation of the fasteners are designed to perform different functions to provide a specific force, or series of forces, at a specific area during a specific time of the installation process of the fastener. These tools can be as simple as a hammer used to provide an impact load to the head of a nail, or vastly complex systems employing automated assembly features.

A typical Buckle and Swage type fastener, as illustrated in U.S. Pat. No. 8,434,984, comprises of a pin and sleeve, such that the fastener is supplied as a single unit, and where the sleeve is designed to deform first in a buckling manner to contact and capture the structure, and second in a swage manner where the sleeve is radially squeezed inward to interact with the pin.

FIG. 1A illustrates a typical stump-type Buckle and Swage fastener and FIG. 1B illustrates a typical installation procedure for the fastener of FIG. 1A within a structure. As shown in FIG. 1A, an uninstalled assembled fastener 100 comprises a pin 70 located within a sleeve 50. To install (or secure) the assembled fastener 100 to a work piece, or structure 102, the assembled fastener 100 may be placed in a prepared aperture 104 located within the work piece, or structure 102. Next, a forming anvil 106 may be placed over the end of the sleeve 50 and an installation force F may be applied to both the fastener manufactured head side 120 and fastener upset side 130 of the assembled fastener 100 as shown. As the force F is applied to both sides, the sleeve 50 buckles, deforming radially outward, while collapsing itself such that an upset head 111 is created which is direct contact with the surface 112 of the work piece, or structure 102.

After formation of the upset head 111, continued application of the force F on the forming anvil 106 forces a column section 53 (adjacent to the upset head 111 and extruding from the structure 102) of the sleeve 50 to move radially inward and around externally threaded locking grooves 74 of the pin 70, creating a permanent interlocking feature 110. (See FIG. 1B) The forming anvil 106 is then removed, completing the installation process.

Currently, no installation tool or system is designed to provide external force directly to the sleeve end 130 to create the bulb 111 on the sleeve 50 of the fastener 100. While tools exist to bulb solid rivets, and some existing tools may even have a small recess for alignment, these existing tools are solid and designed to move while in constant contact with the upset end of the rivet. Tools also exist to swage material to pins, but not specifically for integrating pins with sleeves and as such, there is currently no installation tool or installation tool system which combines the two actions of buckle and swage.

Furthermore, it must also be noted that buckling a hollow fastener sleeve to create the desired bulb carries some added intricacies not shared by the buckle process of a solid rivet. Specifically, hollow fastener sleeves are prone to a double buckle or double bulb, a process where a second bulb forms on the sleeve column adjacent to an initial bulb. This can be caused due to the ratio of the height of the column to be buckled as compared to the cross-sectional area of the column being too large, and/or due to the workability of the material used being such that as the first bulb is formed, the material in that area is hardened making the adjacent column section above easier to deform as compared to the continued deformation of the existing bulb. This double bulb scenario is detrimental to the mechanical properties of the fastener as it means the bulb in contact with the structure is significantly smaller than desirable and thus only a fraction of the desired area of the structure at the surface 112 is in contact with the fastener.

In addition to the problems described above, improved fastener installations and mechanical properties are needed for push-type fasteners and pull-type fasteners as well as the buckle and swage fastener 100 shown in FIGS. 1A and 1B. In the case of installing push-type fasteners with a simple flat piece of material, there are several issues that may occur, specifically with flush type fasteners. Referring to FIG. 1B, the fastener manufactured head 120 of any flush type fastener is designed to fit precisely into the matching recess generated within the structure 102. In the case of a push-type flush head fastener, where force is used to hold the fastener manufactured head 120 in place and counter act the installation forces on the fastener upset side 130 during the installation process, it is possible to not properly seat the fastener manufactured head 120 within the structure 102. This can occur if the fastener manufactured head 120 is even slightly smaller than the matching recess. Thus, a large flat stock of material, which spans the gap and is flush to the surface would create a small void between the fastener head and the pocket. It is possible to use a small tool to only make contact with the fastener manufactured head 120, but alignment would be an issue and if the tool is too small the user runs the risk of "dishing" the fastener head such that the defined angle, e.g. 100 degrees, is deformed to an undesirable smaller angle, e.g. 90 degrees, creating voids between the fastener head and the matching recess. In the event of a sleeved fastener, such as the one shown in FIGS. 1A and 1B, too much force applied only on the manufactured head of the pin 70 may cause the sleeve head 55 to deform beyond flush, creating drag on the flying structure if not sanded down, and reducing the desired wall thickness of the fastener head to shank junction, leading to lower mechanical values of tension and fatigue.

In view of the above, what is needed is a tooling installation system having unique tools which provide an external force directly to the sleeve end of a fastener to create a bulb on the sleeve of the fastener. Additionally, the novel tooling installation system described in the present disclosure may define a sleeve capture nose with specific geometry to capture the sleeve column such that a double buckle or double bulb cannot take place.

SUMMARY

The following presents a simplified summary of one or more implementations in order to provide a basic understanding of some implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

According to one aspect, a manufactured head retaining tool for securing a plurality of workpieces with a buckle and swage type fastener is provided. The manufacturing head retaining tool comprises a housing having a first side and a second side integrally connected by a base forming a cavity, where the cavity includes an upper cavity portion and a lower cavity portion; a sleeve head interaction piece having a first sleeve end and a second sleeve end, the sleeve head interaction pieced adapted to be received within the upper cavity portion of the housing; a pin head interaction piece, having an upper and a lower end, extending vertically through the sleeve head interaction piece such that the lower end of the pin head interaction piece extends into the lower cavity portion of the housing forming a gap between the pin head interaction piece and the base of the housing; a first movement mechanism located within and between the pin head interaction piece and the base of the housing; and a second movement mechanism located around an outer surface of the lower end of the pin head interaction piece within the lower cavity portion of the housing. The first movement mechanism and the second movement mechanism moves the manufactured head retaining tool between a first position and a second position.

According to one feature, when in the first position, the first and second movement mechanisms are both in an extended position allowing for the gap to be open; and wherein when in the second position, the first and second movement spring mechanisms are contacted upon application of forces onto the manufactured head retaining tool resulting in the gap closing.

According to another feature, the pin head interaction piece further includes an alignment nose extending vertically outward from the upper end of the pin head interaction piece.

According to yet another feature, the lower end of the pin interaction piece includes an opening extending from a bottom surface of the pin head interaction piece vertically upward at least partially into the lower end of the pin head interaction piece.

According to yet another feature, the base of the housing includes a second opening which is aligned with the first opening in the lower end of the pin head interaction piece.

According to yet another feature, the first movement mechanism extends within and between the first and second opening.

According to yet another feature, the first and second movement mechanisms are springs.

According to another aspect, an installation tool for buckling a fastener sleeve column of a buckle and swage type fastener is provided. The tool comprises a housing having a first side having a first vertical member integrally connected to a first horizontal member; a second side having a second vertical member integrally connected to a second horizontal member, where the first and second sides form a cavity having an upper cavity portion and a lower cavity portion; and an aperture located between the first and second horizontal member. The tool further comprises a sleeve capture nose located at least partially in the lower cavity portion of the housing, the sleeve capture nose including an opening, having a first end and a second end, extending vertically through the sleeve capture nose; and a buckling pin, the buckling pin comprising a locating section having an upper end and a lower end; a loading head secured to the upper end and on top of the locating section, the locating section extending into the aperture of the housing; and a buckling section extending vertically downward from the lower end of the locating section; and a movement mechanism located around an outer surface of the locating section.

According to one feature, side ends of the loading head are on top of the first and second horizontal members of the housing.

According to another feature, the opening comprises a first inner diameter extending from the first end to a first point within the opening; and a second inner diameter extending from the second to a second point within the opening; and wherein the second point is located below the first point; and wherein the distance between the first point and the second point forms a transition zone which increases linearly in size from the first point to the second point.

According to yet another feature, the locating section is in the upper cavity portion.

According to yet another feature, the movement mechanism is a spring.

According to yet another feature, the movement mechanism is selected from the group consisting of a hydraulic mechanism, a pneumatic mechanism and an electric power supply and controls mechanism.

According to yet another aspect, an installation tooling system for installing a fastener comprising a pin located within a sleeve where the pin includes a pin head end and an opposing tail end is provided. The system comprises a manufactured head retaining tool adapted for contacting the pin head end during installation of the fastener. The manufactured head retaining tool comprises a first housing having a first side and a second side integrally connected by a base forming a first cavity, where the first cavity includes a first upper cavity portion and a first lower cavity portion; a sleeve head interaction piece having a first sleeve end and a second sleeve end, the sleeve head interaction pieced adapted to be received within the upper cavity portion of the housing; a pin head interaction piece, having an upper and a lower end, extending vertically through the sleeve head interaction piece such that the lower end of the pin head interaction piece extends into the lower cavity portion of the housing forming a gap between the pin head interaction piece and the base of the housing; a first movement mechanism located within and between the pin head interaction piece and the base of the housing; and a second movement mechanism located around an outer surface of the lower end of the pin head interaction piece within the lower cavity portion of the housing.

The installation tooling system further comprises an installation tool adapted for contacting the tail end during installation of the fastener. The installation tool comprises a second housing having a first side having a first vertical member integrally connected to a first horizontal member; a second side having a second vertical member integrally connected to a second horizontal member, where the first and second sides form a second cavity having a second upper cavity portion and a second lower cavity portion; and an aperture located between the first and second horizontal members. The installation tool further comprises a sleeve capture nose located at least partially in the second lower cavity portion of the second housing, the sleeve capture nose including a first opening, having a first end and a second end, extending vertically through the sleeve capture nose. The installation tool also comprises a buckling pin which comprises a locating section having an upper end and a lower end; a loading head secured to the upper end and on top of the locating section, the locating section extending into the aperture of the housing; and a buckling section extending vertically downward from the lower end of the locating section. The installation tool also comprises a third movement mechanism located around an outer surface of the locating section.

According to one feature, the installation tool further comprises a swage tool adapted to swage the sleeve of the fastener during installation. The installation swage tool comprises a first swage end; a second swage end opposing the first end; and a second opening extending from the first swage end to the second swage end. The opening having an inner surface comprising an inlet diameter; a swage diameter extending from the inlet diameter to the first swage end; and a relief area integrally extending from the second swage end to the connected to the swage diameter.

According to another feature, the relief area of the inner surface has a relief area diameter, the relief area diameter having a uniform diameter extending from the second swage end to a first point of the inner surface; and wherein from the first point on the inner surface to a second point on the inner surface the relief area diameter decreases.

According to yet another feature the swage diameter extends from the second point of the inner surface to a third point on the inner surface.

According to another feature, the inlet diameter extends from the third point to the first swage end.

BRIEF DESCRIPTION OF THE DRAWINGS

Various features, nature and advantages may become apparent from the detailed description set forth below when taken in conjunction with the drawings in which like reference characters identify correspondingly throughout.

FIGS. 7A and 7B illustrate the process of swaging the fastener sleeve column into the fastener pin component with the installation tooling, in accordance with one aspect of the present disclosure.

DETAILED DESCRIPTION OF THE DRAWINGS

Figure 1:
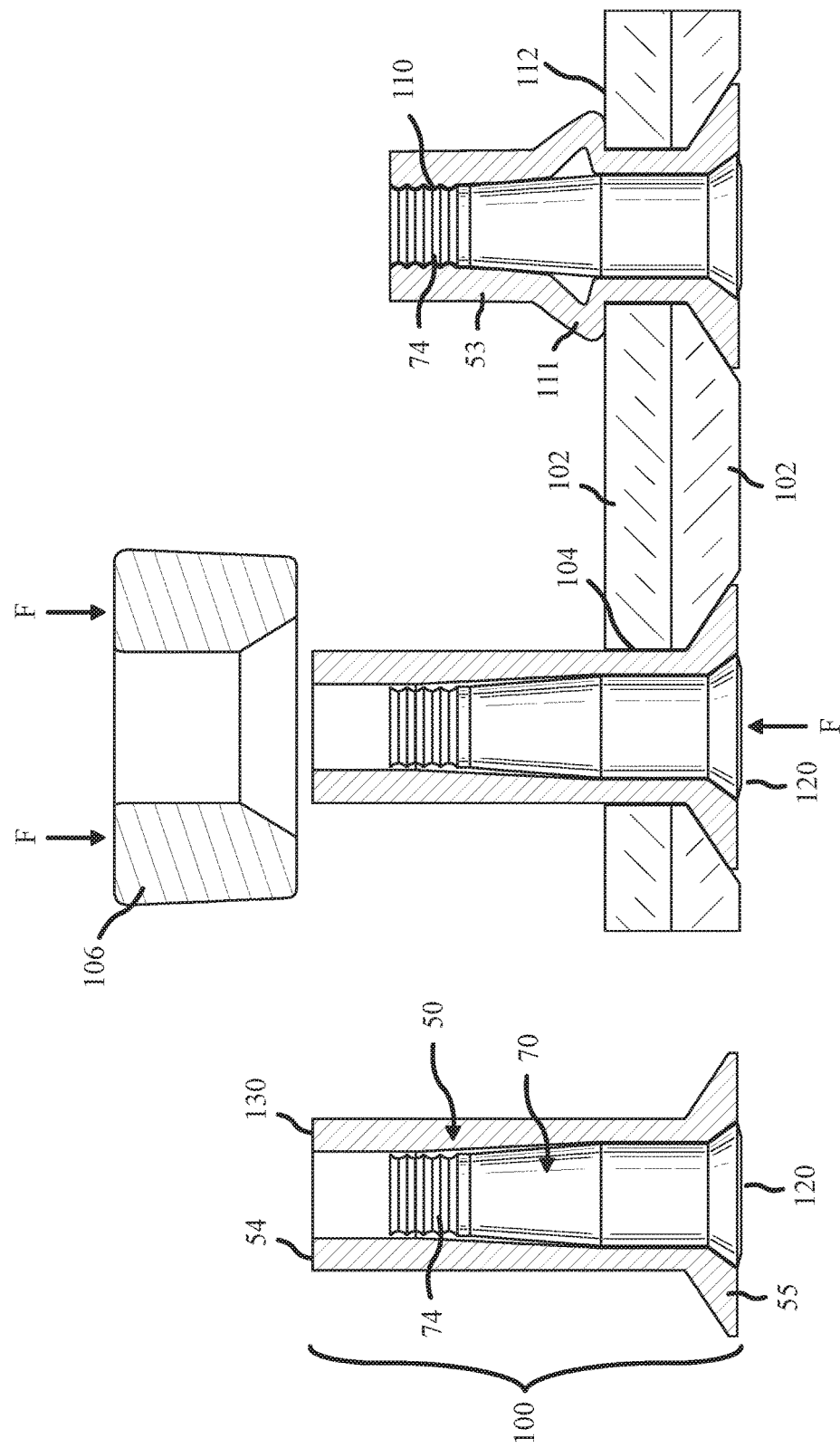
FIG. 1A illustrates a typical stump-type Buckle and Swage fastener.
FIG. 1B illustrates a typical installation procedure for the fastener of FIG. 1A within a structure.

In the following description numerous specific details are set forth in order to provide a thorough understanding of the invention. However, one skilled in the art would recognize that the invention might be practiced without these specific design details. In other instances, well known methods, procedures, and/or components have not been described in detail so as not to unnecessarily obscure aspects of the invention.

Buckle and Swage Type Fastener and General Installation Overview

The installation process best suited for a buckle and swage type fastener is accomplished by the installation tooling system of the present disclosure. The installation tool system include three major processes. These processes, described below in further detail, include the process of holding the fastener manufactured head in place on one side of the structure, the process of buckling the fastener sleeve column, and the process of swaging the fastener sleeve into the fastener pin.

The installation tooling system is specifically designed for the installation of fasteners comprised of the two components pin and sleeve for buckle and swage installations. The installation tooling system having unique features which provide external forces directly to the sleeve end of the fastener to deform a portion of the sleeve radially outward and onto the structure prior to swaging a second portion of the sleeve radially inward onto the pin. The installation tooling system also having features to control the formation of the sleeve by capturing an external portion of the sleeve and creating a cavity between the tool and the structure in order to achieve proper bulb formation during the installation process prior to swage. Another feature exists to provide specific forces to each of the head of the pin and head of the sleeve to insure proper seating of the fastener head against the structure such that it may induce residual compressive stresses within the structure, thus improving mechanical properties such as fatigue life of the structure.

Buckle and Swage Type Fastener Installation Tooling

An installation tooling system that is used to install Buckle and Swage type fasteners, at minimum, needs to have the ability to transfer the required installation forces to (1) the fastener manufactured head 120 of the fastener 100, in order to keep the fastener 100 in place during the installation; (2) the fastener upset side 130 to buckle the sleeve 50 creating the upset head 111; and (3) swage the column section 53 of the sleeve 50 radially inward around the externally threaded locking grooves 74 of the pin 70, creating the permanent interlocking feature 110. The novel tooling of the present disclosure described herein will facilitate transfer of these forces. While the figures and descriptions here are shown in mechanical forms (i.e. having spring mechanisms), it should be understood that these tools could operate on the principals of hydraulic, pneumatic, or electric power supply and controls as well.

In the present disclosure, the installation tooling system comprises a plurality of tools that may be used alone or in combination for installing fasteners, such as the fastener shown in FIG. 1A. In the system of the present disclosure, a fastener manufactured head side tool 200 is provided. The fastener manufactured head side tool 200 is used for transferring an installation load to the fastener head through relative movement of the components of the fastener manufactured head side tool 200 such that the fastener is seated properly within the structure. An example of a very simple retaining tool currently used in the industry for the fastener manufactured head side may be a flat piece of material, such as a bucking bar. However, for improved fastener installations and mechanical properties described above, one conceptual design employing mechanical elements is shown in FIG. 2.

Manufactured Head Retaining Tool

Figure 2:
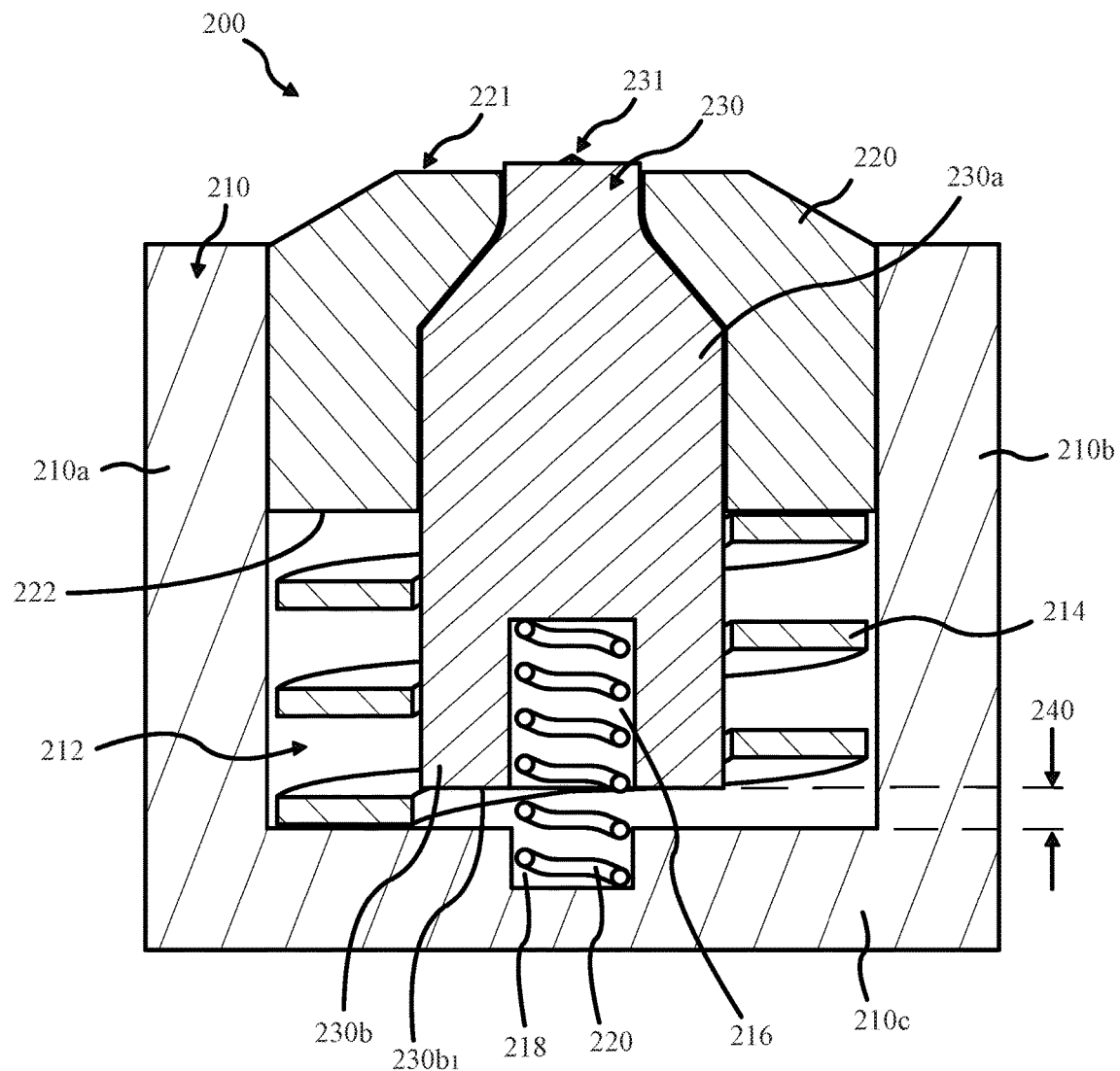
FIG. 2 illustrates an installation tool for seating the manufactured head, in accordance with one aspect of the present disclosure.

FIG. 2 illustrates the manufactured head retaining tool 200 designed to seat the fastener manufactured head 120 and hold the fastener 100 in place during installation in a work piece, in accordance with one aspect. The manufactured head retaining tool 200 comprises a housing 210 having a first side 210a and a second side 210b integrally connected by a base 210c forming a cavity 212, the cavity 212 having an upper cavity portion and a lower cavity portion. The external geometry of the housing 210 allows the manufactured head retaining tool 200 to be matched and used by current force delivery systems used in the industry. As such, the manufactured head retaining tool 200 of the present disclosure may act as an end effecter for automatic assembly systems. That is, the manufactured head retaining tool 200 acts as a nosepiece which is attached to a larger tool which creates the forces of installation.

The manufactured head retaining tool 200 may further comprise a sleeve head interaction piece 220 and a pin head interaction piece 230. The sleeve head interaction piece 220, having a first sleeve end 221 and an opposing second sleeve end 222, is adapted to be received within the upper cavity portion of the housing 210. Additionally, the first sleeve end 221 of the sleeve head interaction piece 220 may have specific geometry that conforms to the fastener 100 to ensure complete seating of the sleeve head interaction piece 200 with the fastener 100 as well as introduce residual compressive stresses in the structure as needed. That is, the geometry could indent or deform the sleeve head 55 to ensure a match fit to the structure. The presence of residual compressive stresses around the fastener hole helps enhance the fatigue life of the structure 102. Since fatigue generates under applied tensile stress and is related to the magnitude of tensile stress, whenever the compressive residual stresses exist within the structure applied external tensile stresses must first overcome these residual compressive stresses. Thus, the net value of tensile stress applied to the structure which can potentially create a fatigue crack is reduced. The applied installation forces on the fastener head transfer some of these forces to the structure and create these desired compressive stresses on the structure.

The pin head interaction piece 230, having an upper end 230a and a lower end 230b, extends vertically through the sleeve head interaction piece 220 such that the lower end 230b of the pin head interaction piece 230 extends into the lower cavity portion of the housing 210 forming a gap 240 between the pin head interaction piece 230 and the base 210c of the housing. That is, the pin head interaction piece 230, does not come into contact with the base 210c of the housing 210 while in a first state.

Figure 3:
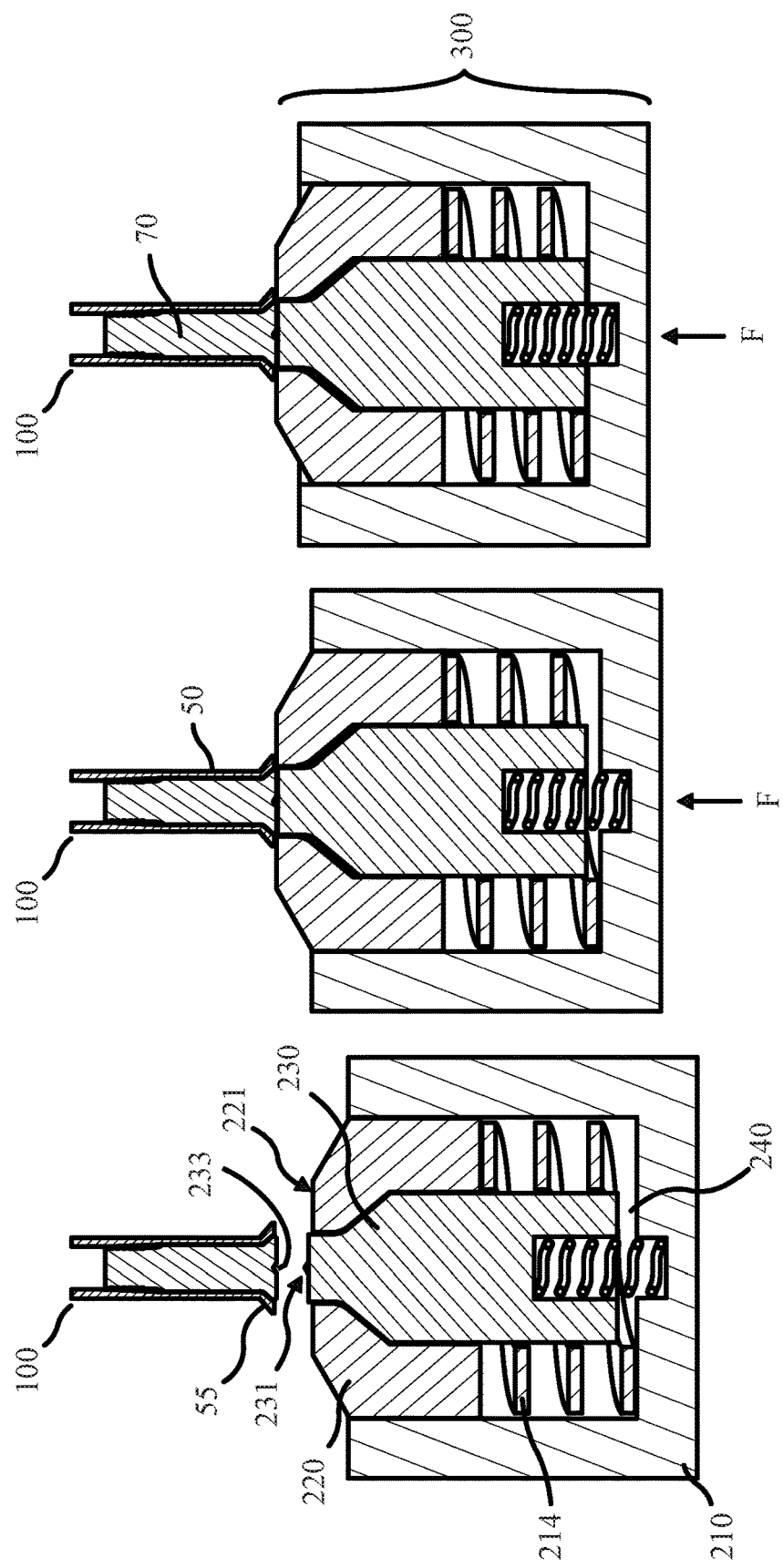
FIGS. 3A, 3B and 3C illustrate the installation process of an installation tool for seating the manufactured head interacting with the typical Buckle and Swage type fastener, in accordance with an aspect of the present disclosure.

In other words, the sleeve head interaction piece 220 has an inner geometry capable of retaining the pin head interaction piece 230 or put another way, the pin head interaction piece 230 has an outer geometry designed to fit within the inner geometry of the sleeve head interaction piece 220. Furthermore, the outer diameter of the sleeve head interaction piece 220 is designed to fit within the cavity of the housing 210. According to one embodiment, the pin head interaction piece 230 may further include an alignment nose 231 extending vertically outward from the upper end 230a of the pin head interaction piece 230. As shown in FIG. 2, the alignment nose 231 may be a small protrusion sticking upwardly outward from approximately the center of the edge of the upper end 230a. The alignment nose 231 is designed to center the manufactured head retaining tool 200 to the fastener 100 which has a matching recession 233 (See FIG. 3) in the head of the fastener pin 70 adapted to receive the alignment nose 231 according to one embodiment, In another embodiment, the head of the fastener pin 70 may have a flat surface and the recess 233 is formed when forces (F) are applied to the manufactured head retaining tool 200 and the alignment nose 231 comes into contact with the flat head of the fastener pin 70 creating the recess 233.

The lower end 230b of the pin head interaction piece 230 may include an opening 216 extending from the bottom surface $230b_1$ of the pin head interaction piece 230 vertically upward at least partially into the lower end 230b of the pin head interaction piece 230. Additionally, the base 210c of the housing 210 also includes an opening 218 which is aligned with the opening 216 in the lower end 230b of the pin head interaction piece 230c. A first spring mechanism 220 (or spring) may be located within and extend between the openings 216 and 218. A second spring mechanism 214 (or spring) may be located around outer surface of the lower end 230b of the pin head interaction piece 230 located within the lower portion of the cavity 212.

The first spring mechanism 220 and the second spring mechanism 214 allow the manufactured head retaining tool 200 to operate between a first position and a second position as shown in FIGS. 3A-3C. When in the first position, the first and second spring mechanism 220, 214 are both in an extended position allowing for the gap 240 to be open as shown in FIG. 2. Conversely, when in the second position, the first and second spring mechanism 220, 214 are being contacted upon application of forces onto the manufactured head retaining tool 200 resulting in the gap 240 closing. That is, when the first spring mechanism 220 is compressed such that the base 210c of the housing comes into contact with the bottom surface $230b_1$ of the pin head interaction piece 230, the gap 240 closes and all additional loads and forces (F) will be transferred directly from the housing 210 to the head of the fastener pin 70. Additionally, compressing the first spring mechanism 220 causes the first sleeve end 221 of the sleeve head interaction piece 220 to contact the fastener sleeve 50 while the second sleeve end 222 of the sleeve head interaction piece 220 comes in contact with the second spring mechanism 214 such that as forces (F) are applied during installation, the sleeve head interaction piece 220 can adjust its position within the cavity 212 of the housing 210 as required.

Additionally, the second spring mechanism 214 constrained within the housing 210 may have a desired preload applied by the sleeve head interaction piece 220. As the manufactured head retaining tool 200 is employed this preload becomes the force which moves the sleeve interaction tool 220 within the housing 210, and consequently applies force directly to the sleeve manufactured head 55 of the fastener 100.

The first spring mechanism 220 may be designed to initially apply a small force to the pin interaction tool 230, such that it remains properly located within the sleeve interaction tool 220, until the gap 240 is closed during the relative movement of the installation process, and any additional force travels from the housing 210, directly through the pin head interaction piece 230, to the head of the fastener pin 70.

The first and second spring mechanisms as shown in the figures are by way of example and any type of movement mechanism may be utilized. According to other embodiments, the movement mechanisms may be hydraulic, pneumatic, or electric power supply and controls.

FIGS. 3A, 3B and 3C illustrate the installation process of an installation tool for seating the manufactured head interacting with the typical Buckle and Swage type fastener, in accordance with an aspect of the present invention. First, as shown in FIG. 3A, the manufactured head retaining tool 200 is aligned with a fastener 100 by matching the alignment nose 231 to a matching recession 233 in the head of the fastener pin 70. A force F is then applied axially on the housing 210, which travels through the second spring mechanism 214, to the sleeve head interaction tool 220, and onto the sleeve head 55 of the fastener sleeve 50. This initial load captures the sleeve head 55 from deforming outside of the structure and ensures a good seat of the manufacture fastener head 120 to the structure. This in turn means a better fatigue life of the structure. When the proper load is reached, the second spring mechanism 214 will begin to deform such that the housing 210 will begin to move toward the structure and reduce the gap 240. (See FIG. 3B) When this movement equals that of the gap 240 and the gap 240 is closed, the pin interaction tool 230 will be in contact with the housing base 210*c*, transferring all additional loads and forces directly from the housing 210, through the pin head interaction tool 230, to the head of the fastener pin 70. (See FIG. 3C) It is in this collapsed state 300 (See FIG. 3C) that the manufacture head tool 200 will spend almost the entire installation process.

Installation Tool

The fundamental function of the installation tool 400 (or buckling process tool) is to transfer an installation load to the fastener sleeve upset end 130, through relative movement of the tool components, such that the fastener sleeve 50 buckles at the desired location, forming a single bulb 111 against the structure 102. One conceptual design employing mechanical elements is shown in FIG. 4.

Figure 4:
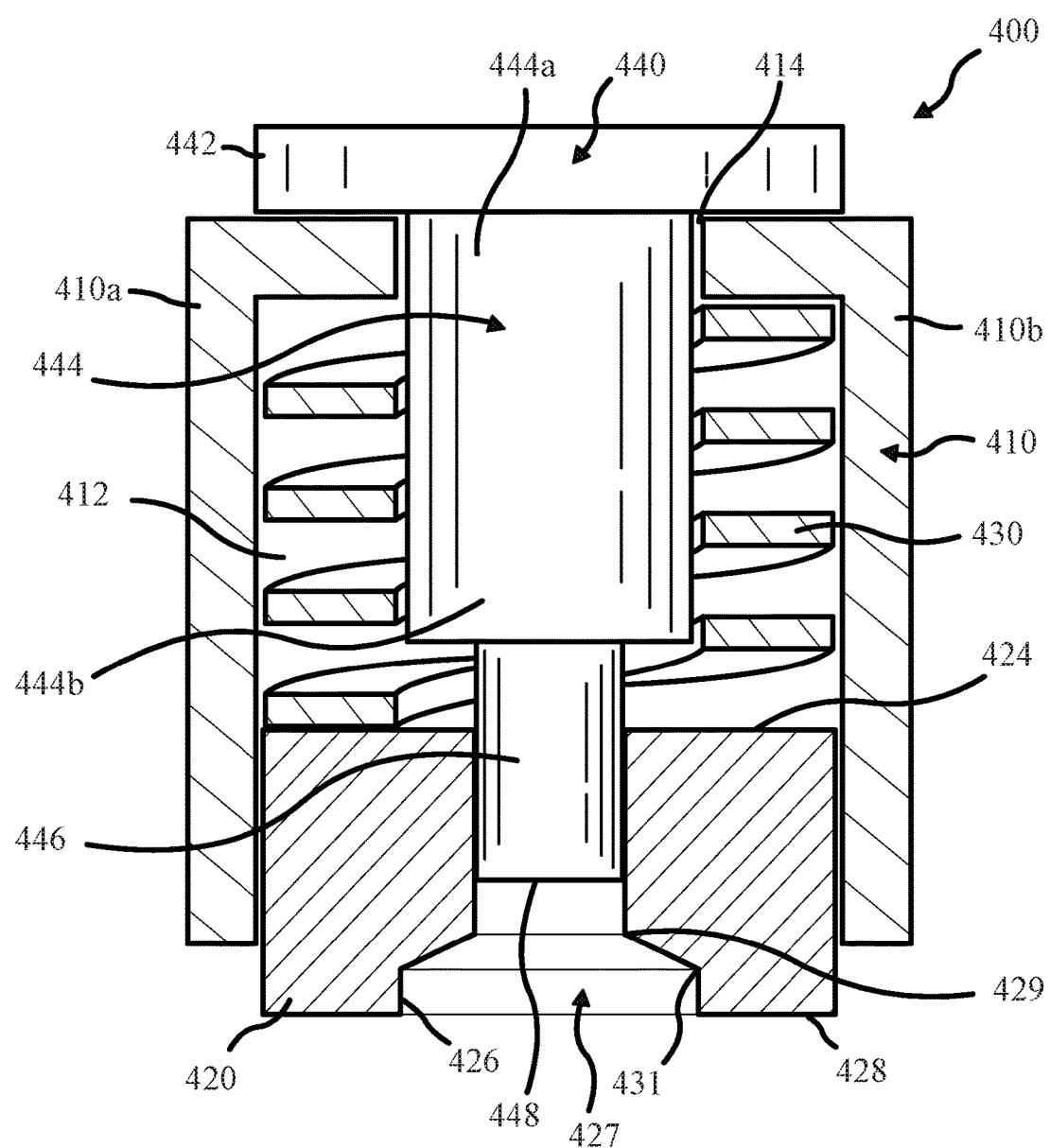
FIG. 4 illustrates an installation tool for buckling the fastener sleeve column, in accordance with one aspect of the present disclosure.
Figure 5A:
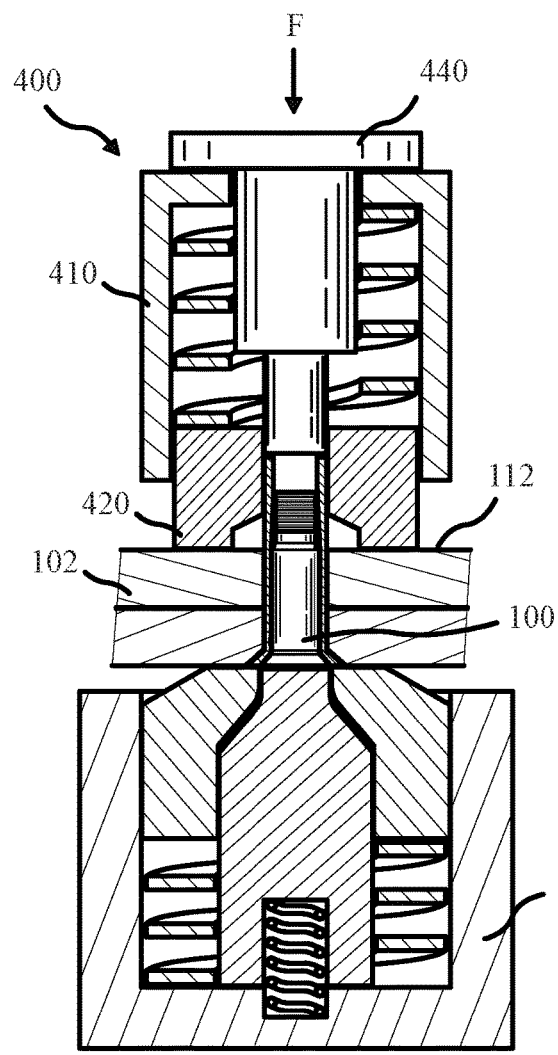
FIGS. 5A and 5B illustrate the process of seating the manufactured head and buckling the fastener sleeve column with the installation tooling, in accordance with one aspect of the present disclosure.
Figure 5B:
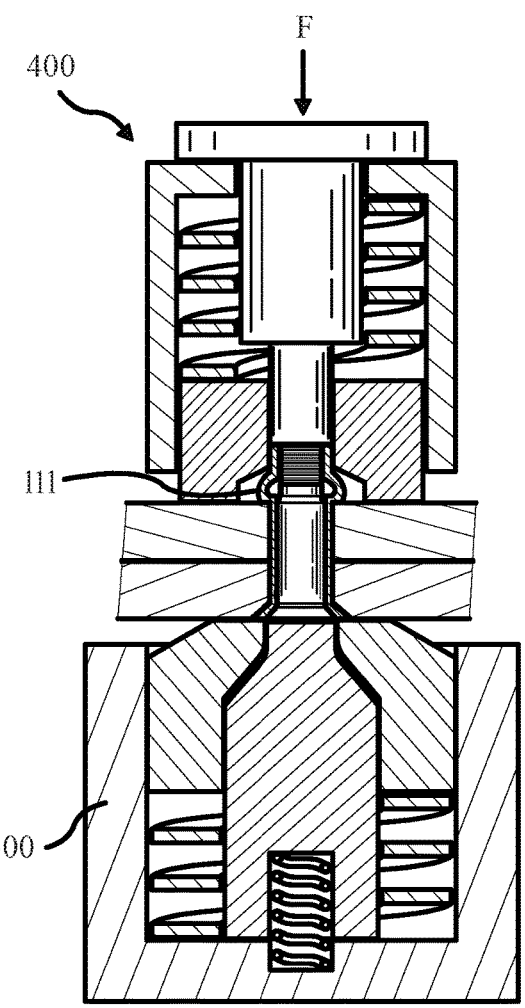

FIG. 4 illustrates an installation tool 400 for buckling the fastener sleeve column, in accordance with one aspect. The installation tool 400 may be used in combination with the manufactured head retaining tool 200, as shown in FIGS. 5A-5B. The installation tool 400 comprises a housing 410 having a first side 410*a* and a second side 410*b* with each side having a vertical member integrally connected to a horizontal member forming a cavity 412, having an upper cavity portion and a lower cavity portion, and an aperture 414 located between and separating the horizontal members of each side of the housing.

The installation tool 400 further comprises a sleeve capture nose 420 located at least partially in the lower cavity portion of the housing, the sleeve capture nose 420 including an opening 427 extending from a first end to a second end 428. The opening 427 includes a first inner diameter extending from the first end 424 of the sleeve capture nose 420 to a first point 429 within the opening 427 and designed to closely fit around the diameter of the assembled fastener 100. This will capture a portion of the sleeve and ensure the sleeve buckling process takes place at the desired location during the installation. The opening in the sleeve capture nose 420 further includes a second inner diameter 426 extending from the second end 428 of the sleeve capture nose 420 to a second point 431 located within the opening 427. Located between the first and second inner diameters is a transition zone in which the inner diameter increases linearly in size from the first point 429 to the second point 431. The transition zone and second inner diameter 426 accommodate the sleeve bulb formed during the buckling process. According to one aspect, the first inner diameter closely matches and captures a portion of the sleeve diameter. According to one aspect, the second inner diameter and transition zone, when located in place on the fastener and onto the structure during the installation process, form a cavity in which the fastener sleeve may bulb under load.

The installation tool 400 further comprises a buckling pin 440 comprising a locating section 444, the locating section 444 having an upper end 444*a* and a lower end 444*b*. The buckling pin 440 further comprises a loading head 442 secured to the upper end 444*a* and on top of the locating section 444, the locating section 444 extending into the aperture 414 of the housing 410. As can be seen in FIG. 4, the side ends of the loading head are located on top of the first and second horizontal members of the housing 410. The buckling pin 440 also comprises a buckling section 446 extending vertically downward from the lower end 444*b* of the locating section The configuration of the buckling pin 400 with the locating section 444 connected perpendicularly to the loading head 442 and adapted to be received within aperture of the housing 410 allows the buckling section 446 to be centered within the installation tool 400, and centered to fit within the first inner diameter of the sleeve capture nose 420. The buckling pin terminates at an end 448 which is designed to be in contact with, and transfer the buckling force to, the fastener sleeve end 54 during the installation process. A spring mechanism 430 (or spring or movement mechanism) may be located around outer surface of the locating section 444 located within the upper portion of the cavity.

The second end 428 of the sleeve capture nose 420 may be designed to be in contact with the structure or workpiece 102 such that when an axial load is applied to the loading head 442 (causing the spring mechanism 430 to compress) during installation of the fastener 100, a portion of the load is transferred through the housing 410, to the spring mechanism, to the sleeve capture nose 420, and delivered to the structure surface 112 to provide the desired preload during installation of the fastener 100. (Proper preload within the structure improves fatigue life of the structure and thus provides for a desirable fastener installation.)

The spring mechanism as shown in the figures are by way of example and any type of movement mechanism may be utilized. According to other embodiments, the movement mechanism may be hydraulic, pneumatic, or electric power supply and controls.

FIGS. 5A and 5B illustrate the buckling installation tool 400 performing the buckling of the fastener sleeve 50 to form the bulb 111. It should be noted that during the buckling process, the cavity created by the transition area between points 429 and 431, and the second inner diameter 426, of the sleeve capture nose 420 is the only area in which the sleeve 50 may buckle and deform when placed under load. Thus, by capturing a portion of the sleeve column within the opening 427 of the sleeve capture nose 420, the bulb 111 is always formed properly and against the structure.

With the sleeve buckling process complete, the fastener may be swaged to the pin in order to create the permanent interlocking feature 110, as shown in FIGS. 7A-7B.

Installation Swage Tool

Figure 6:
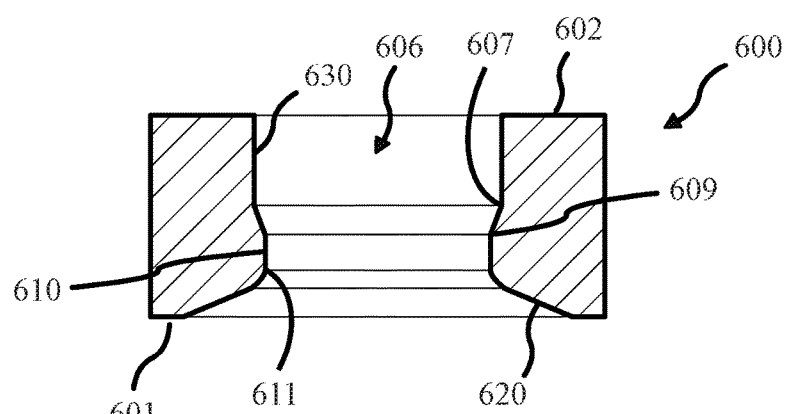
FIG. 6 illustrates an installation tool for swaging the fastener sleeve column into the fastener pin component, in accordance with an aspect of the present disclosure.

FIG. 6 illustrates an installation swage tool 600 for swaging the fastener sleeve column 53 into the fastener pin locking grooves 74, in accordance with an aspect of the present disclosure. The installation swage tool 600, having a first end 601 and an opposing second end 602 with an opening 604 extending from the first end 601 to the second end 602, is forced over the fastener sleeve 50 causing the outer diameter of the sleeve to be forced radially inward, reducing the outer diameter of the sleeve to that of the swage tool swage diameter, and thus forcing material of the sleeve 50 radially inward into the pin locking grooves 74.

As shown, the opening 604 of the installation swage tool 600 has an inner surface comprising a swage diameter 610 extending from an inlet diameter 620 to the first end 601. The inner surface of the opening 602 of the swage tool 600 also includes a relief area 630 extending from the second end 602 to the swage diameter. The second end 602 of the installation swage tool accepts an axial load to provide the force necessary to deform the sleeve 50.

The geometry of the first end 601 is such that as the swage tool 600 is employed and pushed to full depth, this geometry may contact and interact with the sleeve bulb 111 formed in the buckling process. Furthermore, this geometry and interaction may be designed to leave a marking on the sleeve bulb 111 such that the end user has visual evidence that the installation is complete and the sleeve 50 has been properly swaged in place.

As shown in FIG. 6, the relief area 630 has a constant diameter from the second end to a first point 607 and then the diameter decreases linearly to a second point 609 forming a transition zone. The swage diameter 610 has a constant diameter and extends from the second point 609 to a third point 611. The inlet diameter 620 has a diameter that increases as it extends from the third point 611 to the first end 601.

FIGS. 7A and 7B illustrate the process of swaging the fastener sleeve column into the fastener pin component with the installation tooling, in accordance with one aspect of the present disclosure. In other words, the swage tool 600 forces the sleeve 50 radially inward to interact with the pin locking groove section 74. When the swage is complete and all tooling is removed from the structure, the fastener installation process is considered complete.

As shown in FIGS. 2-7A-7B, it is necessary to have a tool on each side of the structure at all times providing forces to the fastener. Although not described in detail, the sleeve buckling installation tool of FIG. 4 and the installation swage tool of FIG. 6 may be combined into a single tool to increase productivity and speed up installation times. A design of this nature may be of mechanical, pneumatic, or other operating styles.

One or more of the components and functions illustrated in the figures may be rearranged and/or combined into a single component or embodied in several components without departing from the invention. Additional elements or components may also be added without departing from the invention. Additionally, the features described herein may be implemented in software, hardware, as a business method, and/or combination thereof.

While certain exemplary embodiments have been described and shown in the accompanying drawings, it is to be understood that such embodiments are merely illustrative of and not restrictive on the broad invention, and that this invention is not be limited to the specific constructions and arrangements shown and described, since various other modifications may occur to those ordinarily skilled in the art.

The invention claimed is:

1. A manufactured head retaining tool for securing a plurality of workpieces with a buckle and swage type fastener, the tool comprising:
a housing having a first side and a second side integrally connected by a base forming a cavity, where the cavity includes an upper cavity portion and a lower cavity portion;
a sleeve head interaction piece having a first sleeve end and a second sleeve end, the sleeve head interaction pieced adapted to be received within the upper cavity portion of the housing;
a pin head interaction piece, having an upper and a lower end, extending vertically through the sleeve head interaction piece such that the lower end of the pin head interaction piece extends into the lower cavity portion of the housing forming a gap between the pin head interaction piece and the base of the housing;
a first movement mechanism located within and between the pin head interaction piece and the base of the housing; and
a second movement mechanism located around an outer surface of the lower end of the pin head interaction piece within the lower cavity portion of the housing; and
wherein the first movement mechanism and the second movement mechanism moves the manufactured head retaining tool between a first position and a second position.

2. The tool of claim 1, wherein when in the first position, the first and second movement mechanisms are both in an extended position allowing for the gap to be open; and wherein when in the second position, the first and second movement spring mechanisms are contacted upon application of forces onto the manufactured head retaining tool resulting in the gap closing.

3. The tool of claim 1, wherein the pin head interaction piece further includes an alignment nose extending vertically outward from the upper end of the pin head interaction piece.

4. The tool of claim 1, wherein the lower end of the pin interaction piece includes an opening extending from a bottom surface of the pin head interaction piece vertically upward at least partially into the lower end of the pin head interaction piece.

5. The tool of claim 4, wherein the base of the housing includes a second opening which is aligned with the first opening in the lower end of the pin head interaction piece.

6. The tool of claim 5, wherein the first movement mechanism extends within and between the first and second opening.

7. The tool of claim 6, wherein the first and second movement mechanisms are springs.

8. The tool of claim 6, wherein the first movement mechanism is selected from the group consisting of a hydraulic mechanism, a pneumatic mechanism and an electric power supply and controls mechanism.

9. The tool of claim 6, wherein the second movement mechanism is selected from the group consisting of a hydraulic mechanism, a pneumatic mechanism and an electric power supply and controls mechanism.

10. An installation tool for buckling a fastener sleeve column of a buckle and swage type fastener, the tool comprising:
a housing, the housing comprising:
a first side having a first vertical member integrally connected to a first horizontal member;
a second side having a second vertical member integrally connected to a second horizontal member, where the first and second sides form a cavity having an upper cavity portion and a lower cavity portion; and
an aperture located between the first and second horizontal members;

a sleeve capture nose located at least partially in the lower cavity portion of the housing, the sleeve capture nose including an opening, having a first end and a second end, extending vertically through the sleeve capture nose;

a buckling pin, the buckling pin comprising:
  a locating section having an upper end and a lower end;
  a loading head secured to the upper end and on top of the locating section, the locating section extending into the aperture of the housing; and
  a buckling section extending vertically downward from the lower end of the locating section; and
a movement mechanism located around an outer surface of the locating section.

11. The tool of claim 10, wherein side ends of the loading head are on top of the first and second horizontal members of the housing.

12. The tool of claim 10, wherein the opening comprises:
  a first inner diameter extending from the first end to a first point within the opening; and
  a second inner diameter extending from the second to a second point within the opening; and
  wherein the second point is located below the first point; and
  wherein the distance between the first point and the second point forms a transition zone which increases linearly in size from the first point to the second point.

13. The tool of claim 10, wherein the locating section is in the upper cavity portion.

14. The tool of claim 10, wherein the movement mechanism is a spring.

15. The tool of claim 10, wherein the movement mechanism is selected from the group consisting of a hydraulic mechanism, a pneumatic mechanism and an electric power supply and controls mechanism.

16. An installation tooling system for installing a fastener comprising a pin located within a sleeve where the pin includes a pin head end and an opposing tail end, the system comprising:
  a manufactured head retaining tool adapted for contacting the pin head end during installation of the fastener, the manufactured head retaining tool comprising:
    a first housing having a first side and a second side integrally connected by a base forming a first cavity, where the first cavity includes a first upper cavity portion and a first lower cavity portion;
    a sleeve head interaction piece having a first sleeve end and a second sleeve end, the sleeve head interaction pieced adapted to be received within the upper cavity portion of the housing;
    a pin head interaction piece, having an upper and a lower end, extending vertically through the sleeve head interaction piece such that the lower end of the pin head interaction piece extends into the lower cavity portion of the housing forming a gap between the pin head interaction piece and the base of the housing;
    a first movement mechanism located within and between the pin head interaction piece and the base of the housing; and
    a second movement mechanism located around an outer surface of the lower end of the pin head interaction piece within the lower cavity portion of the housing; and
  an installation tool adapted for contacting the tail end during installation of the fastener, the installation tool comprising:
  a second housing, the second housing comprising:
    a first side having a first vertical member integrally connected to a first horizontal member;
    a second side having a second vertical member integrally connected to a second horizontal member, where the first and second sides form a second cavity having a second upper cavity portion and a second lower cavity portion; and
    an aperture located between the first and second horizontal members;
  a sleeve capture nose located at least partially in the second lower cavity portion of the second housing, the sleeve capture nose including a first opening, having a first end and a second end, extending vertically through the sleeve capture nose;
  a buckling pin, the buckling pin comprising:
    a locating section having an upper end and a lower end;
    a loading head secured to the upper end and on top of the locating section, the locating section extending into the aperture of the housing; and
    a buckling section extending vertically downward from the lower end of the locating section; and
  a third movement mechanism located around an outer surface of the locating section.

17. The system of claim 16, further comprising an installation swage tool adapted to swage the sleeve of the fastener during installation, the installation swage tool comprising:
  a first swage end;
  a second swage end opposing the first end; and
  a second opening extending from the first swage end to the second swage end, the opening having an inner surface comprising;
    an inlet diameter;
    a swage diameter extending from the inlet diameter to the first swage end; and
    a relief area integrally extending from the second swage end to the connected to the swage diameter.

18. The system of claim 17, wherein the relief area of the inner surface has a relief area diameter, the relief area diameter having a uniform diameter extending from the second swage end to a first point of the inner surface; and wherein from the first point on the inner surface to a second point on the inner surface the relief area diameter decreases.

19. The system of claim 18, wherein the swage diameter extends from the second point of the inner surface to a third point on the inner surface.

20. The system of claim 19, wherein the inlet diameter extends from the third point to the first swage end.

* * * * *